B. DEVLIN.
SAFETY GAS COCK.
APPLICATION FILED SEPT. 30, 1911.
1,020,807.
Patented Mar. 19, 1912.
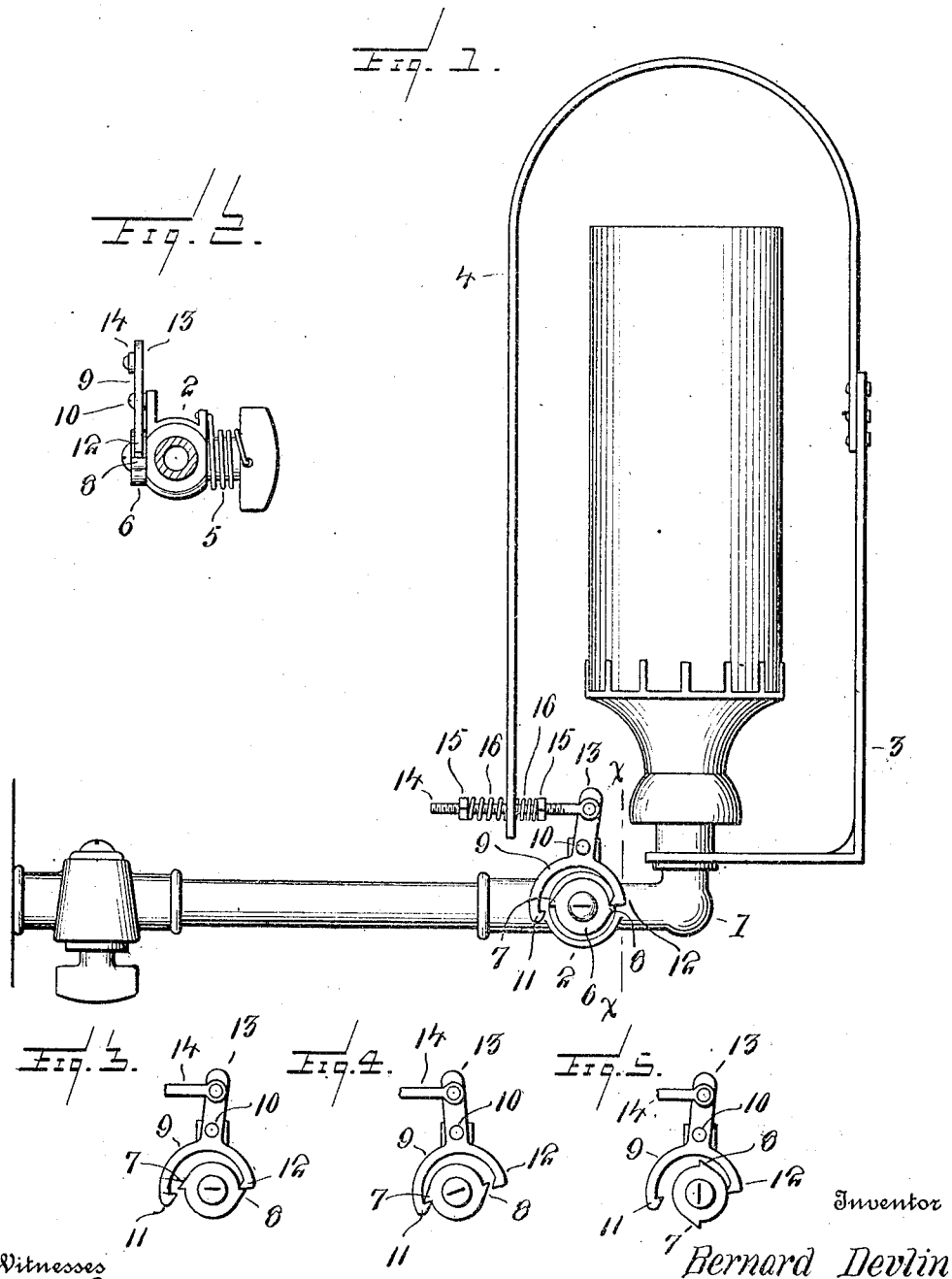
Witnesses
E. R. Ruppert
U. B. Hillyard
Inventor
Bernard Devlin
By Victor J. Evans
Attorney

UNITED STATES PATENT OFFICE.

BERNARD DEVLIN, OF JERSEY CITY, NEW JERSEY.

SAFETY GAS-COCK.

1,020,807. Specification of Letters Patent. Patented Mar. 19, 1912.

Application filed September 30, 1911. Serial No. 652,049.

*To all whom it may concern:*

Be it known that I, BERNARD DEVLIN, a citizen of the United States, residing at Jersey City, in the county of Hudson and State of New Jersey, have invented new and useful Improvements in Safety Gas-Cocks, of which the following is a specification.

The invention provides a novel device for positively and automatically shutting off the flow of gas should the light become extinguished from any cause, thereby preventing fatalities, such as death by asphyxiation, or loss of property by fire or explosion.

In its specific construction the invention provides a gas cock having unique safety appliances which are automatically operated to insure a shutting off of the flow of gas after the light has become extinguished from any cause whatsoever, thereby preventing the escape of the gas and the attending objections incident thereto, some of which have been heretofore enumerated.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a side view of a gas fixture provided with a self-closing gas cock embodying the invention. Fig. 2 is a section on the line x—x of Fig. 1. Figs. 3, 4 and 5 are detail views, showing the different positions of the valve controlling mechanism.

Corresponding and like parts are referred to in the following description, and indicated in all the views of the drawing, by the same reference characters.

The body of the gas cock is indicated at 1 and may be of any construction and is provided with the usual plug valve 2 for controlling the flow of gas. The gas cock may be located at any point in the length of the fixture and as shown is adapted to receive the burner and supports a bracket 3 to which is attached a thermostat 4, which is substantially of U form so as to extend over the burner and become heated by the flame resulting from burning the gas issuing therefrom. A spring 5 normally exerts a force to hold the plug valve 2 in closed position. The spring 5 is of helical form and is mounted upon an end portion of the valve 2 and has one end connected to said valve and its opposite end secured to the body of the cock 1. The end of the plug valve projecting beyond the body of the cock receives a washer 6, which is connected thereto in a manner to rotate therewith. This washer has two stops 7 and 8 which are located at diametrically opposite points. The washer with its stops constitutes a controlling disk and is adapted to coöperate with lever 9, which is pivoted at 10 to an extension of the body 1 and has a stem and oppositely disposed pallets 11 and 12 which are adapted to engage the respective stops 7 and 8. The stem 13 of the lever has a rod 14 pivotally connected thereto, said rod being threaded throughout its length and passing loosely through an opening formed in the free end of the thermostat 4. Set nuts 15 are mounted upon the threaded rod 14 upon opposite sides of the thermostat, and springs 16 are interposed between the respective set nuts and the thermostat to allow for excessive contraction or expansion of the thermostat to prevent injury or a straining of the working parts.

When the gas is shut off the parts of the controlling mechanism consisting of the lever 9 and disk 6 occupy the position substantially as shown in Fig. 5. When the plug valve 2 is turned to permit a flow of gas to the burner the parts of the controlling mechanism assume the position substantially as shown in Fig. 3, that is with the stop 8 engaged by the pallet 12, thereby holding the valve 2 open against the tension of the closing spring 5 until the gas has been lighted and the thermostat 4 initially heated to cause expansion thereof. When the gas is burning and the thermostat heated the parts of the controlling mechanism assume the position indicated in Fig. 4, that is with the pallet 12 clear of the stop 8 and the pallet 11 in engagement with the stop 7 so as to hold the valve open against the tension of the closing spring 5. In the event of the light being extinguished from any cause the thermostat 4 cools and contracts, thereby moving the lever 9 into the position indicated in Fig. 5, thereby withdrawing the pallet 11 from engagement with the stop 7 when the spring 5 will come into play and close the valve 2, thereby shutting off the flow of gas.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A safety gas cock comprising a body, a plug valve rotatably mounted in the body for controlling the flow of gas therethrough, a spring normally exerting a pressure upon the plug valve to hold the same in closed position, a controlling disk connected with the plug valve to turn therewith and provided at opposite points with stops, a lever having pallets to engage the stops of the controlling disk, a thermostat arranged to be heated by the flame resulting from burning the gas controlled in its flow by the said gas cock, a threaded rod having pivotal connection with the lever and passing loosely through an opening of the thermostat, and set nuts mounted upon the threaded rod upon opposite sides of the thermostat.

2. A safety gas cock comprising a body, a plug valve rotatably mounted in the body for controlling the flow of gas therethrough, a spring normally exerting a pressure upon the plug valve to hold the same in closed position, a controlling disk connected with the plug valve to turn therewith and provided at opposite points with stops, a lever having pallets to engage the stops of the controlling disk, a thermostat arranged to be heated by the flame resulting from burning the gas controlled in its flow by the said gas cock, a threaded rod having pivotal connection with the lever and passing loosely through an opening of the thermostat, set nuts mounted upon the threaded rod upon opposite sides of the thermostat, and springs mounted upon the threaded rod and interposed between the set nuts and the thermostat.

In testimony whereof I affix my signature in presence of two witnesses.

BERNARD DEVLIN.

Witnesses:
ALVAH A. KNOWLES,
W. H. SPEER.

Copies of this patent may be obtained for five cents each, by addressing the "Commissioner of Patents, Washington, D. C."